US006019134A

United States Patent [19]

Onishi

[11] Patent Number: 6,019,134

[45] Date of Patent: Feb. 1, 2000

[54] HIGH-PRESSURE ACCUMULATOR

[75] Inventor: Yoshihiko Onishi, Tokyo, Japan

[73] Assignee: Mitsubishi Denki Kabushiki Kaisha, Tokyo, Japan

[21] Appl. No.: 09/179,445

[22] Filed: Oct. 27, 1998

[30] Foreign Application Priority Data

Apr. 15, 1998 [JP] Japan .................................. 10-105062

[51] Int. Cl.[7] ....................................................... F16L 55/04

[52] U.S. Cl. ................................ 138/30; 138/31; 138/26; 220/721

[58] Field of Search ................................ 138/26, 30, 31; 220/720–724

[56] References Cited

U.S. PATENT DOCUMENTS

| | | | |
|---|---|---|---|
| 3,366,144 | 1/1968 | Durst | 138/30 |
| 3,628,573 | 12/1971 | Loliger | 138/30 |
| 3,862,708 | 1/1975 | Waxlax | 138/30 X |
| 3,948,288 | 4/1976 | Mayer | 138/30 |

FOREIGN PATENT DOCUMENTS 2-225801 9/1990 Japan .

*Primary Examiner*—Patrick Brinson
*Attorney, Agent, or Firm*—Sughrue, Mion, Zinn Macpeak & Seas, PLLC

[57] ABSTRACT

A high-pressure accumulator is provided which protects a diaphragm from abnormal displacement. A high-pressure vessel 101 is provided with support portions 107, 108 having contact portions facing the vicinity of the central portion of a diaphragm 106. The support portions are annular and have the same center as that of the high-pressure chamber. The support portions may also have a plurality of holes. The support portions have curved surfaces 107*a*, 108*a* which make contact with the diaphragm uniformly when the diaphragm is displaced. In addition, the support portions may be either integrated with or separated from a case 101. A seal portion is disposed on the cylindrical outer wall 109*a* of a plate 109 disposed in a position on the opposite side of the diaphragm 106 from the case 101.

20 Claims, 7 Drawing Sheets

HIGH-PRESSURE ACCUMULATOR

BACKGROUND OF THE INVENTION

1. Field of the Invention

The present invention relates to a high-pressure accumulator provided with support portions which prevent abnormal displacement of a flexible disk-shaped metal diaphragm disposed in a high-pressure vessel which supports and seals the perimeter portion of the diaphragm to form a high-pressure chamber.

2. Description of the Related Art

Diesel engines are the most widely known of the so-called "cylinder-injected" or "direct injection engines", engines in which fuel is injected into the engine cylinder, but in recent years cylinder-injected spark ignition engines (gasoline engines) have also been proposed. Cylinder-injected engines of this kind demand that fuel pressure surges be minimized to maintain sufficiently high fuel injection pressure and ensure stable injection. To this end, compact single-cylinder high-pressure fuel pumps have been proposed which are of simple construction and inexpensive to manufacture.

However, because there is only one plunger in the single-cylinder system, there are surges of quite some amplitude in the pressure of the fuel discharged, and so surge absorption devices with metal bellows or diaphragms have been proposed to absorb these surges.

FIG. 11 shows a high-pressure fuel supply system provided with a high-pressure accumulator which is a useful example of a surge absorption device to which the present invention can be applied. In FIG. 11, a delivery pipe 1, which is a fuel injection apparatus, is provided with a plurality of injectors 1*a* corresponding to the number of engine cylinders, which are not shown. A high-pressure fuel pump assembly 200 provided with a high-pressure fuel pump 3 is disposed between the delivery pipe 1 and a fuel tank 2. The delivery pipe 1 and the high-pressure fuel pump 3 are connected by a high-pressure fuel passage 4, and the high-pressure fuel pump 3 and the fuel tank 2 are connected by a low-pressure fuel passage 5. Together, the high-pressure fuel passage 4 and the low-pressure fuel passage 5 compose a fuel passage connecting the delivery pipe 1 to the fuel tank 2. A filter 6 is disposed in the fuel intake of the high-pressure fuel pump 3 to prevent contamination by foreign matter above a certain size downstream from the fuel supply system, i.e., the high-pressure fuel pump 3, high-pressure accumulator, etc. A check valve 7 is disposed on the fuel discharge side of the high-pressure fuel pump 3. A drain 8 attached to the high-pressure fuel pump 3 returns to the fuel tank 2.

A low-pressure fuel pump 10 is disposed at the end of the low-pressure fuel passage 5 close to the fuel tank 2. A filter 11 is disposed in the fuel intake of the low-pressure fuel pump 10. A check valve 12 is disposed in the low-pressure fuel passage 5 on the fuel discharge side of the low-pressure fuel pump 10. A low-pressure regulator 14 is disposed in the low-pressure fuel passage 5 between the high-pressure fuel pump 3 and the low-pressure fuel pump 10. A filter 15 is disposed in the fuel intake of the low-pressure regulator 14. A drain 16 attached to the low-pressure regulator 14 returns to the fuel tank 2.

The high-pressure fuel pump 3 increases the pressure of the fuel supplied to it by the low-pressure fuel passage 5 and discharges it to the delivery pipe 1. A dumper 30 is disposed on the low-pressure fuel passage 5 side of the high-pressure fuel pump 3, i.e., the low-pressure side. A high-pressure accumulator 70 and a high-pressure regulator 32 are disposed on the high-pressure side of the high-pressure fuel pump 3. A drain 33 attached to the high-pressure regulator 32 returns to the fuel input side of the high-pressure fuel pump 3.

FIG. 12, is a cross-section showing details of the high-pressure fuel pump assembly 200 when fully assembled, comprising the high-pressure fuel pump 3, dumper 30, high-pressure accumulator 70, high-pressure regulator 32, filter 6, and check valve 7 (not shown). In FIG. 12, a recess portion 40*c* is formed in the casing 40 on the right-hand side of the diagram, and the high-pressure accumulator 70 is secured to the recess portion 40*c*. A discharge passage 4*b* which communicates with a discharge passage 4*a* is formed as a recess in the bottom of the recess portion 40*c*.

FIG. 13 is a cross-section showing details of the high-pressure accumulator 70, which is a surge absorption device to which the present invention can be applied, and its fitted construction. The high-pressure accumulator 70 is provided with a case 85, which is a high-pressure vessel roughly the shape of a thick disk, a flexible disk-shaped metal diaphragm 86, which is supported by and sealed against the case 85 around its perimeter portion so that together they form a high-pressure chamber 71, and a disk-shaped plate 89, which is a stopper defining the limit of deformation of the diaphragm 86.

The case 85 has a comparatively thin perimeter portion 72, which supports and seals the outer perimeter portion of the diaphragm 86 by a sealing weld, and a comparatively thick central portion 73, in which the high-pressure chamber 71 is formed. A male thread 91 is formed on the cylindrical outer wall of the peripheral portion 72, and a comparatively shallow saucer-shaped recess portion 74, which gradually deepens from the perimeter portion towards the central portion in a smooth curve to allow the diaphragm 86 to deform towards the high-pressure chamber 71, is formed in the portion in close contact with the diaphragm 86. An approximately-cylindrical recess portion 75, which communicates with the shallow saucer-shaped recess portion 74 at the central portion, is formed in the central portion 73 and, together with the saucer-shaped recess portion 74, forms the high-pressure chamber 71.

A gas charge inlet 84 of circular cross-section about its central axis is formed in the ceiling portion of the high-pressure chamber 71 to introduce high-pressure gas to the high-pressure chamber 71 of the case 85 and seal it in, and a sealing device 87 is disposed therein to seal the gas charge inlet 84. The gas charge inlet 84 is provided with a small-diameter portion 76 of comparatively small diameter on the high-pressure side facing the high-pressure chamber 71, and a large-diameter portion 77 of comparatively large diameter on the low-pressure side facing the exterior of the case 85. A shoulder portion 78 is formed between the small-diameter portion 76 and the large-diameter portion 77, and a female thread is formed on the inner wall of the small-diameter portion 76. An annular groove 79 is disposed in the shoulder portion 78 to accommodate an O-ring 88.

The sealing device 87 is a plug member inserted into the described gas charge inlet 84 and has a large-diameter portion 81, which is inserted into the large-diameter portion 77 of the gas charge inlet 84, and a small-diameter portion 80, which has a thread around its outer wall which engages the female thread of the small-diameter portion 76, and the large-diameter portion 81 inserted into the gas charge inlet 84 presses on the O-ring 88 and seals the gas charge inlet 84.

The perimeter portion of the diaphragm 86 is sealed and supported on the outer perimeter portion of the case 85 by a weld portion 82 made by an electron beam or the like, but in addition a saucer-shaped plate 89 is disposed on the diaphragm 86 as a stopper to define the limit of deformation of the diaphragm 86, and the plate 89 is also fastened around its circumference by the weld portion 82. A recess portion 83 shaped like one side of a convex lens is formed on the inner face of the plate 89, which gradually deepens from the outer perimeter portion of the diaphragm 86 towards the center, and communicating holes 90 are formed as fuel channels which communicate with the recess portion 83.

The case 85, the metal diaphragm 86, and the plate 89 are all hermetically sealed and bonded to each other around their outer perimeter portions by welding with an electron beam, or the like. The space sealed between the metal diaphragm 86 and the case 85 is charged with a high-pressure gas such as nitrogen.

A male thread 91 formed around the outside of the case 85 engages a corresponding female thread formed in the recess portion 40*c*, and the high-pressure accumulator 70 is inserted into the plate 89, sealed by an O-ring 51, and secured to the recess portion 40*c* so as to allow the communicating holes 90 to communicate with the discharge passage 4*b*. As it is being secured, the male thread 91 engages the thread in the case 40, and at the same time, the end surface 92 of the plate 89 of the high-pressure accumulator 70 and the O-ring 51 slide past each other around the circumference of the O-ring 51 and generate friction. The high-pressure accumulator 70 is secured to the case 40, and a seal is formed between the end surface 92 and the O-ring 51.

The high-pressure accumulator 70 constructed in this way, absorbs surges in the pressure of the fuel discharged by the discharge passage 4*b*. That is, while fuel is being discharged through the discharge passage 4*b*, surges occur in the discharge passage 4*b*, for example, when the high-pressure fuel pump is operating. The volume of the high-pressure chamber 71 varies in response to changes caused by the surges until the pressure of the high-pressure gas in the high-pressure chamber 71 reaches equilibrium with the pressure in the discharge passage 4*b* through the diaphragm 86. For example, when the pressure in the discharge passage 4*b* rises, the diaphragm 86 is deformed such that the volume of the high-pressure chamber 71 decreases and the volume of the discharge passage 4*b* increases, and so the pressure in the discharge passage 4*b* decreases and surging is reduced.

When an engine stops, the supply of fuel from the high-pressure fuel pump 3 also stops, and the fuel pressure in the lens-shaped recess 83 on the plate 89 side gently decreases. For that reason, the diaphragm 86 is displaced greatly from its position during normal operation shown in the diagram due to the pressure of the gas in the high-pressure chamber 71, but to prevent damage and wear on the diaphragm 86, a diaphragm stopper construction is employed having a curve such that when the diaphragm deforms a certain amount, it comes into contact with the curved surface of the lens-shaped recess 83 on the plate 89 and is not displaced any further, and thus excessive stress does not concentrate on the diaphragm 86.

However, in a conventional accumulator, if the gas sealing capacity of the sealing device 87, which seals the high-pressure gas inside the high-pressure chamber 71, deteriorates due to damage to the sealing device 87 or poor placement, perishing, etc., of the O-ring 88, and the pressure of the high-pressure gas in the high-pressure chamber 71 decreases, or if the fuel pressure in the lens-shaped recess portion 83 rises abnormally due to failure of the high-pressure regulator 32, etc., the diaphragm 86 may be greatly displaced in the direction in which the volume of the high-pressure chamber 71 is reduced. In that case, there is a risk that the diaphragm 86 may be overstressed and damaged. There is also a risk that fuel in the lens-shaped recess portion 83 may leak out of the high-pressure fuel pump assembly through the gas charge inlet 84.

SUMMARY OF THE INVENTION

Consequently, an object of the present invention is to provide a high-pressure accumulator which protects a diaphragm such that the volume of a high-pressure chamber is ensured and the diaphragm is not overstressed, so that surge absorption performance can be maintained.

The high-pressure accumulator according to the present invention is provided with a high-pressure vessel, a flexible disk-shaped metal diaphragm which is sealed and supported around its perimeter portion by the high-pressure vessel to form a high-pressure chamber, and support portions disposed in the high-pressure vessel having contact portions facing the vicinity of the central portion of the diaphragm to limit abnormal displacement of the central portion of the diaphragm.

In the high-pressure accumulator according to the present invention, the contact portions of the support portions may also be annular and have the same center as that of the high-pressure chamber.

In the high-pressure accumulator according to the present invention, the contact portions of the support portions may also have a plurality of holes.

In the high-pressure accumulator according to the present invention, the contact portions of the support portions may also have curved surfaces which extend continuously from the high-pressure vessel and have a plurality of holes.

In the high-pressure accumulator according to the present invention, the support portions may also be integrated with the high-pressure vessel.

In the high-pressure accumulator according to the present invention, the support portions may also be separate members from the high-pressure vessel which are disposed in a recess in the high-pressure vessel.

The high-pressure accumulator according to the present invention may also be provided with a plate having a seal portion on its cylindrical outer wall which is disposed in a position on the opposite side of the diaphragm from the high-pressure vessel.

The high-pressure accumulator according to the present invention may also be provided with a high-pressure vessel, a flexible disk-shaped metal diaphragm which is sealed and supported around its perimeter portion by the high-pressure vessel to form a high-pressure chamber, a support portion disposed in the high-pressure vessel having a contact portion facing the vicinity of the central portion of the diaphragm to limit abnormal displacement of the central portion of the diaphragm, and a plate having a seal portion on its cylindrical outer wall which is disposed in a position on the opposite side of the diaphragm from the high-pressure vessel.

DETAILED DESCRIPTION OF THE PREFERRED EMBODIMENTS

Embodiment 1

Figure 1:
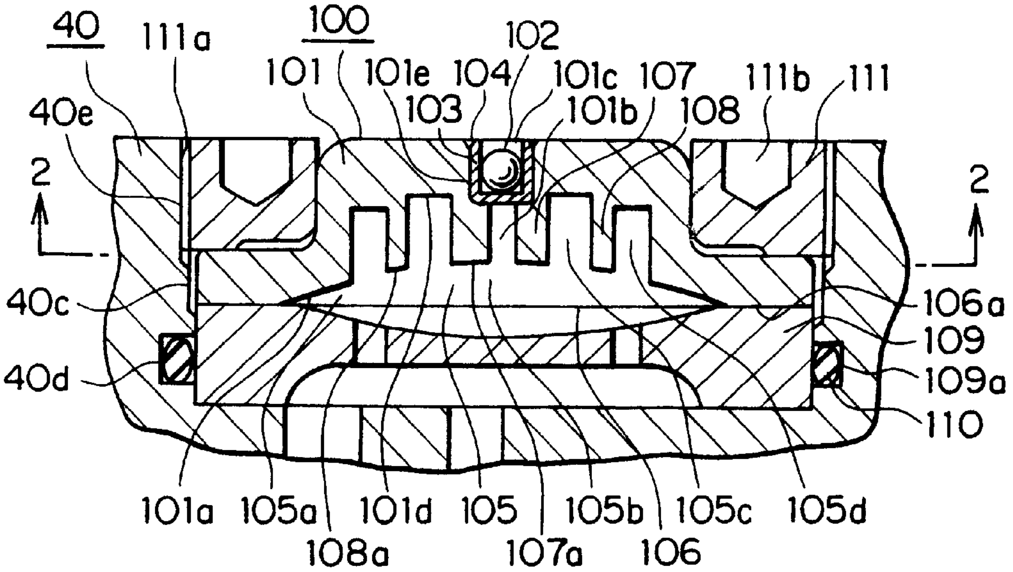
FIG. 1 is a cross-section of the high-pressure accumulator according to Embodiment 1 of the present invention and its fitted construction.
Figure 2:
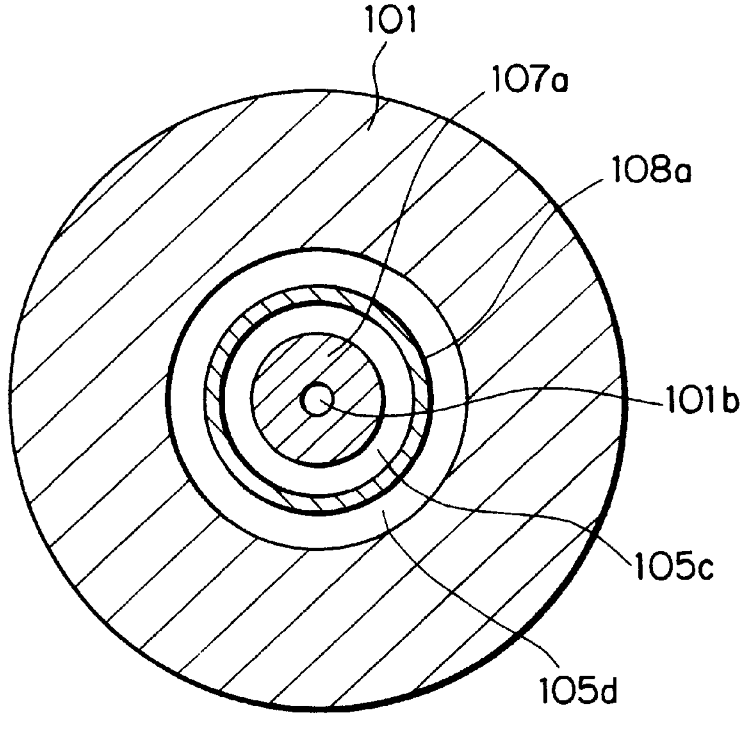
FIG. 2 is a cross-section along line 2—2 in FIG. 1.
Figure 3:
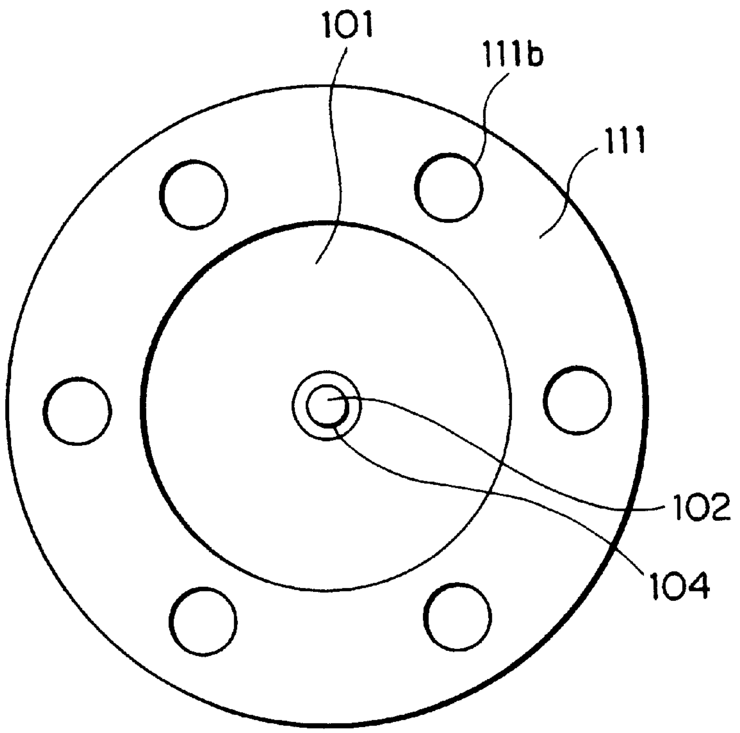
FIG. 3 is a plan of the high-pressure accumulator according to Embodiment 1 of the present invention.

FIGS. 1 to 3 show a high-pressure accumulator 100 which is an embodiment of the present invention and its fitted construction. FIG. 1 is a cross-section of the high-pressure accumulator and its fitted construction. FIG. 2 is a cross-section along line 2—2 in FIG. 1, and FIG. 3 is a plan of the high-pressure accumulator 100. Apart from the shape of the high-pressure chamber, the sealing construction of the gas charge inlet, and the fitted construction of the high-pressure accumulator, the rest of the construction in FIG. 1 is the same as in FIG. 9 and further explanation of the same portions will be omitted.

In FIG. 1, a high-pressure chamber 105 charged with high-pressure gas, which seals and supports the perimeter portion 106*a* of a flexible disk-shaped metal diaphragm 106 is disposed in a case 101 which is a high-pressure vessel. A smooth curve 101*a* to allow the diaphragm 106 to deform towards the high-pressure chamber 105 and a comparatively shallow saucer-shaped recess portion 105*a*, which gradually deepens from the perimeter portion towards the central portion, are formed in the portion in close contact with the diaphragm 106 of the high-pressure chamber 105. In the vicinity of the center of the high-pressure chamber 105, two support portions 107, 108, which are annular, hollow cylinders in shape and have end portions 107*a*, 108*a*, respectively, extend towards the diaphragm 106 from the ceiling 101*d* of the high-pressure chamber 105, and two annular groove portions 105*c*, 105*d* are formed in the high-pressure chamber 105.

Also, the shape of the end portions 107*a*, 108*a* of these support portions 107, 108 closest to the diaphragm 106 is formed into a smooth curve so that when the diaphragm 106 deforms and comes into contact with the support portions 107, 108, the diaphragm 106 makes contact uniformly.

Thus, a saucer-shaped recess portion 105*a* is disposed in the case 101 to allow displacement of the diaphragm 106 and even deeper recess portions are cut therein to provide the high-pressure chamber 105 with necessary volume, and these deep recess portions are annular grooves distributed to prevent abnormal displacement of the diaphragm.

A steel ball 102 is pressed inside a deep, roughly cup-shaped plug member 103, between a cylindrical hole 101*b* formed in the inner wall of the support portion 107 and a gas charge inlet 101*c*, whereby the plug member 103 is pressed against the inner wall 101*e* of the gas charge inlet 101*c* to form a seal. The case 101 and the plug member 103 are welded around their circumferences at the entrance to the gas charge inlet 101*c*, forming an air-tight weld portion 104 between the case 101 and the plug member 103.

A groove 40*d* is formed in the inner wall of a recess portion 40*c* in a casing 40 to accommodate an O-ring, and after mounting an O-ring 110 in the groove 40*d*, the high-pressure accumulator 100 is inserted into the recess portion 40*c*, and when the high-pressure accumulator 100 is fitted into the case 40, the construction is sealed between the high-pressure accumulator 100 and the recess portion 40*c* of the casing 40 and the outer cylindrical wall 109*a* of the plate 109 of the high-pressure accumulator 100 form a seal portion.

A roughly doughnut-shaped plug 111, which has a male thread 111*a* formed on its outer cylindrical wall, is disposed on the gas charge inlet 101*c* side of the high-pressure accumulator 100. As shown in FIG. 3, six cylindrical holes 111*b* are disposed equidistantly around the upper surface of the plug 111, and the high-pressure accumulator 100 is secured in the recess portion 40*c* of the casing 40 by inserting a fastening device, which is not shown, into these cylindrical holes 111*b* and engaging the plug 111 in a female thread 40*e* disposed on the inside wall of the recess portion 40*c* of the casing 40.

In the high-pressure accumulator 100 constructed in this way, the diaphragm 106 is supported by the support portions 107, 108 even if it is greatly displaced by a decrease in the volume of the high-pressure chamber 105, and so the diaphragm 106 is not overstressed, and is therefore not damaged.

Also, because the high-pressure accumulator 100 has no thread engaging portion, friction between the high-pressure accumulator 100 and the O-ring 110, which accompanies engagement of a thread and is caused by the O-ring sliding around the circumference, is avoided, and so the O-ring 110 is not damaged.

Embodiment 2

Figure 4:
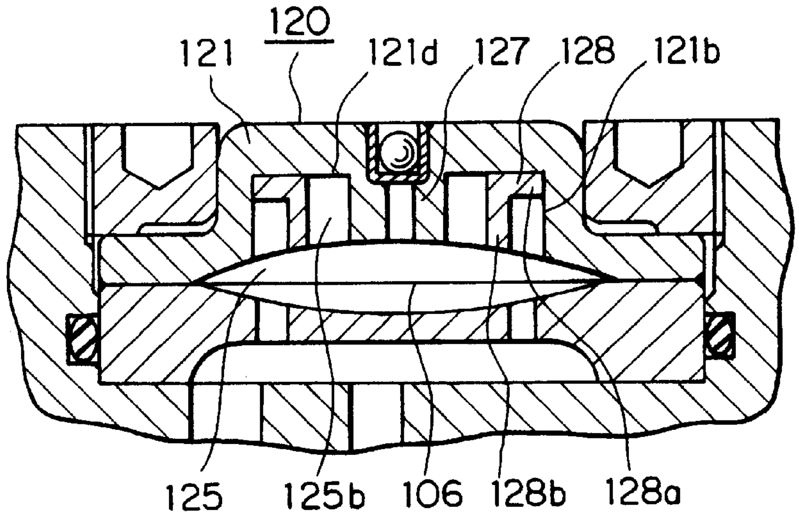
FIG. 4 is a cross-section of the high-pressure accumulator according to Embodiment 2 of the present invention and its fitted construction.

FIG. 4 shows a high-pressure accumulator 120 which is another embodiment of the present invention and its fitted construction. Apart from the fact that, in contrast to FIG. 1, a support portion in this embodiment is a separate member, the rest of the embodiment is the same as in FIG. 1 and further explanation of the common portions will be omitted.

In FIG. 4, a support portion 128, which comprises a flattened hollow cylindrical portion 128*a* disposed at one end and a long thin hollow cylindrical portion 128*b*, is formed as a separate member from a case 121 of a high-pressure chamber 125, and is inserted into and secured to the inner wall 121*b* of a recess portion 125*b* in the case 121.

Further, a second support portion 127, which has an annular, hollow cylindrical portion and is positioned in the vicinity of the center of the high-pressure chamber, is integrated with the case 121 and extends towards the diaphragm 106 from the ceiling 121*d* of the high-pressure chamber 125, but it may be made separately from the case 121 as an independent member or integrated with the support portion 128.

The support portion 128 may also be fixed by adhesive, etc., to the inner wall 121*b* or the ceiling 121*d* of the recess portion 125*b* of the case 121 of the high-pressure chamber 125.

In the high-pressure accumulator 120 constructed in this way, the support portion 128 is separated from the case 121, and so very deep, narrow recessing such as that for the hollow cylindrical holes 105*c*, 105*d* in FIG. 1 becomes unnecessary and milling of the recess portion 125*b* in the case 121 is made easier.

Embodiment 3

Figure 5:
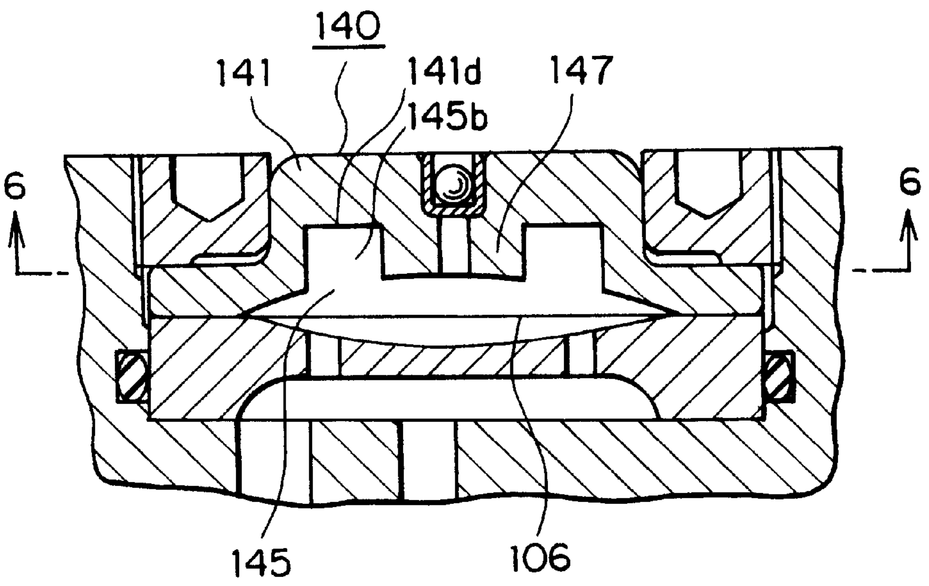
FIG. 5 is a cross-section of the high-pressure accumulator according to Embodiment 3 of the present invention and its fitted construction.
Figure 6:
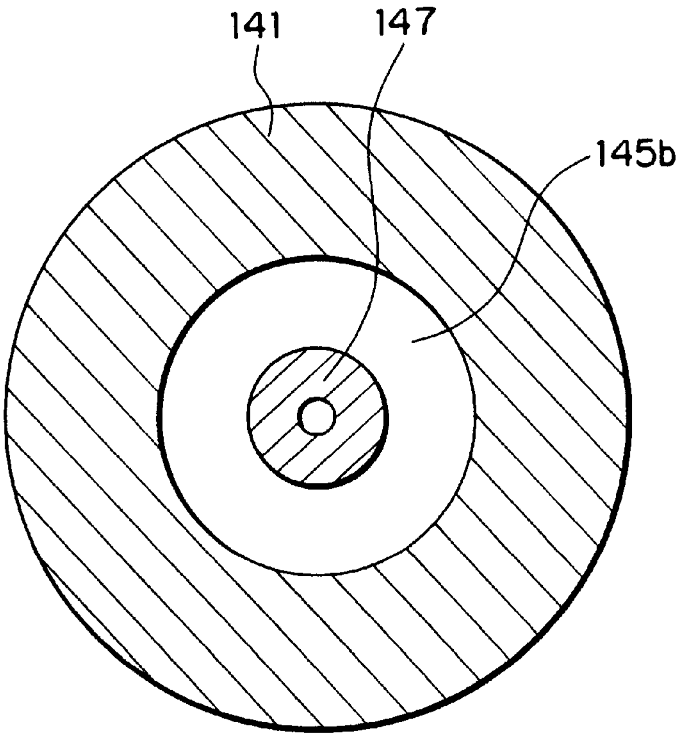
FIG. 6 is a cross-section along line 6—6 in FIG. 5.

FIGS. 5 and 6 show a high-pressure accumulator 140 which is another embodiment of the present invention and its fitted construction. Apart from the fact that, in contrast to FIG. 1, there is only one support portion in this embodiment, the rest of the embodiment is the same as in FIG. 1 and further explanation of the common portions will be omitted.

In FIG. 5, a support portion 147, which is an annular, hollow cylindrical portion, is positioned in the vicinity of the center of a high-pressure chamber 145 and extends towards the diaphragm 106 from the ceiling 141*d* of the high-pressure chamber 145.

In the high-pressure accumulator 140 constructed in this way, there is only one support portion 128, and so very deep, narrow recessing such as that for the hollow cylindrical holes 105*c*, 105*d* in FIG. 1 becomes unnecessary and milling of a recess portion 145*b* in the case 141 is made easier.

Embodiment 4

Figure 7:
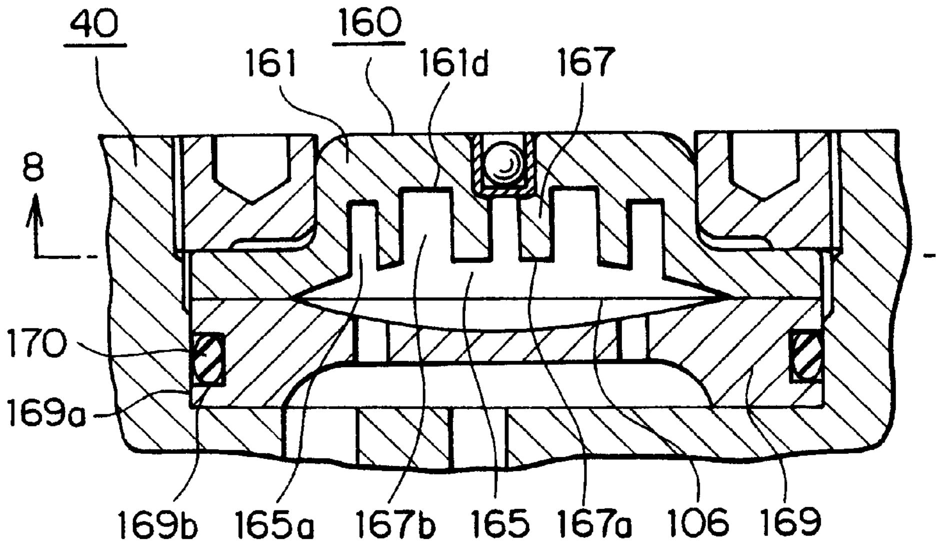
FIG. 7 is a cross-section of the high-pressure accumulator according to Embodiment 4 of the present invention and its fitted construction.
Figure 8:
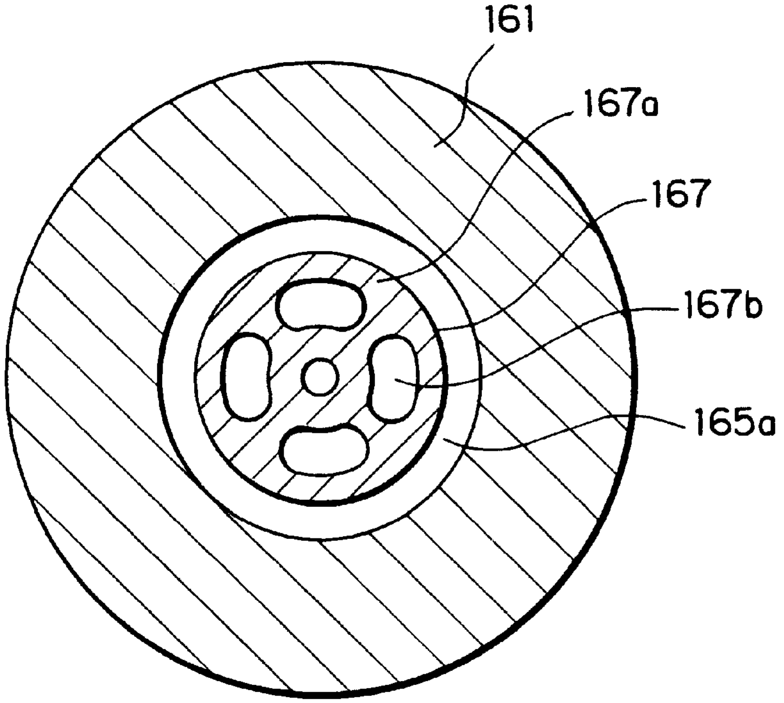
FIG. 8 is a cross-section along line 8—8 in FIG. 7.

FIG. 7 shows a high-pressure accumulator 160 which is another embodiment of the present invention and its fitted construction. FIG. 8 is a cross-section along line 8—8 in FIG. 7. Apart from the fact that the shape of the support portion in this embodiment is different from that in FIG. 1, the rest of the embodiment is the same as in FIG. 1 and further explanation of the common portions will be omitted.

In FIG. 7, a disk-shaped support portion 167, which has a cylindrical hole at its center, is positioned in the vicinity of the center of a high-pressure chamber 165 and extends towards the diaphragm 106 from the ceiling 161*d* of the high-pressure chamber 165. As shown in FIG. 8, the cylindrical hole 161*a* is positioned in the central portion of the support portion 167, and four bean-shaped tubular holes 167*b* are formed in a circle around it.

Also, the shape of the end surface 167*a* of this support portion 167 closest to the diaphragm 106 is formed into a smooth curve so that when the diaphragm deforms and comes into contact with the support portion 167, the diaphragm 106 makes contact uniformly.

A groove 169*b* is formed in the outer cylindrical wall 169*a* of the plate 169 of the high-pressure accumulator 160 to accommodate an O-ring, and after mounting an O-ring 170 in the groove 169*b*, the high-pressure accumulator 160 is inserted into the recess portion 40*c*, and when the high-pressure accumulator 160 is fitted, the construction is sealed between the high-pressure accumulator 160 and the recess portion 40*c* of the casing 40 and the O-ring 170 of the high-pressure accumulator 160 form a seal portion.

In the high-pressure accumulator 160 constructed in this way, the diaphragm 106 is supported by the support portion 167 over a wide contact surface even if the diaphragm is greatly displaced by a decrease in the volume of the high-pressure chamber 165, and so the diaphragm 106 is even less likely to be overstressed, and is therefore not damaged.

Embodiment 5

Figure 9:
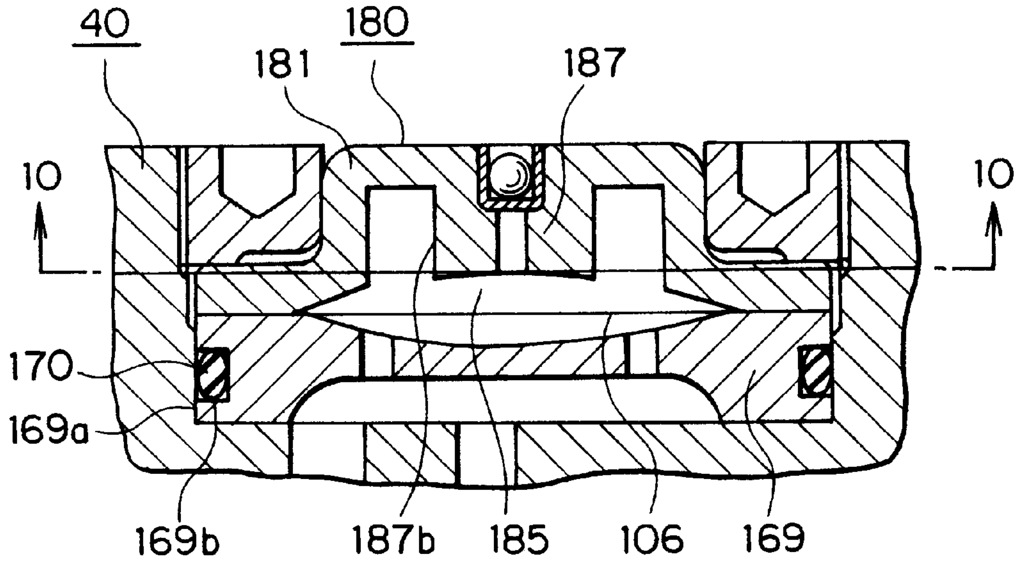
FIG. 9 is a cross-section of the high-pressure accumulator according to Embodiment 5 of the present invention and its fitted construction.
Figure 10:
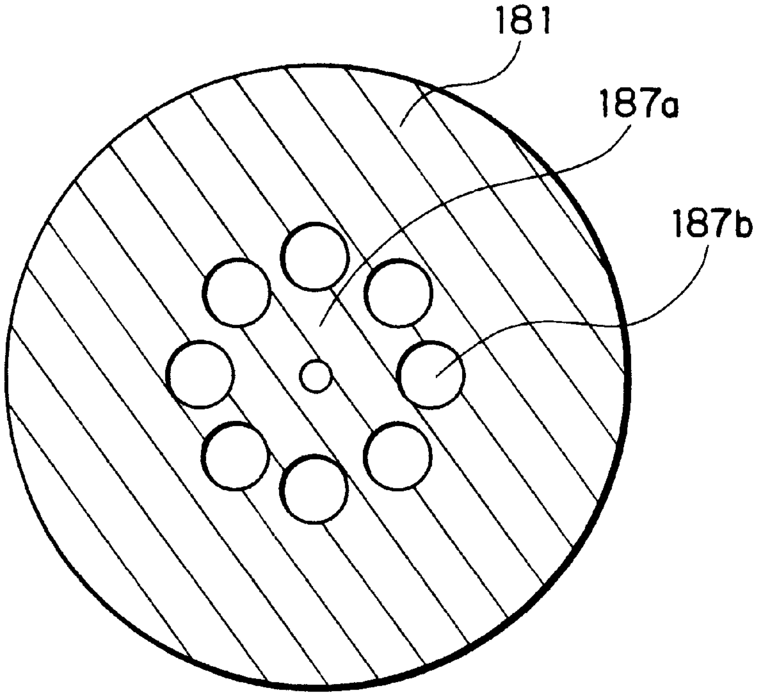
FIG. 10 is a cross-section along line 10—10 in FIG. 9.
Figure 11:
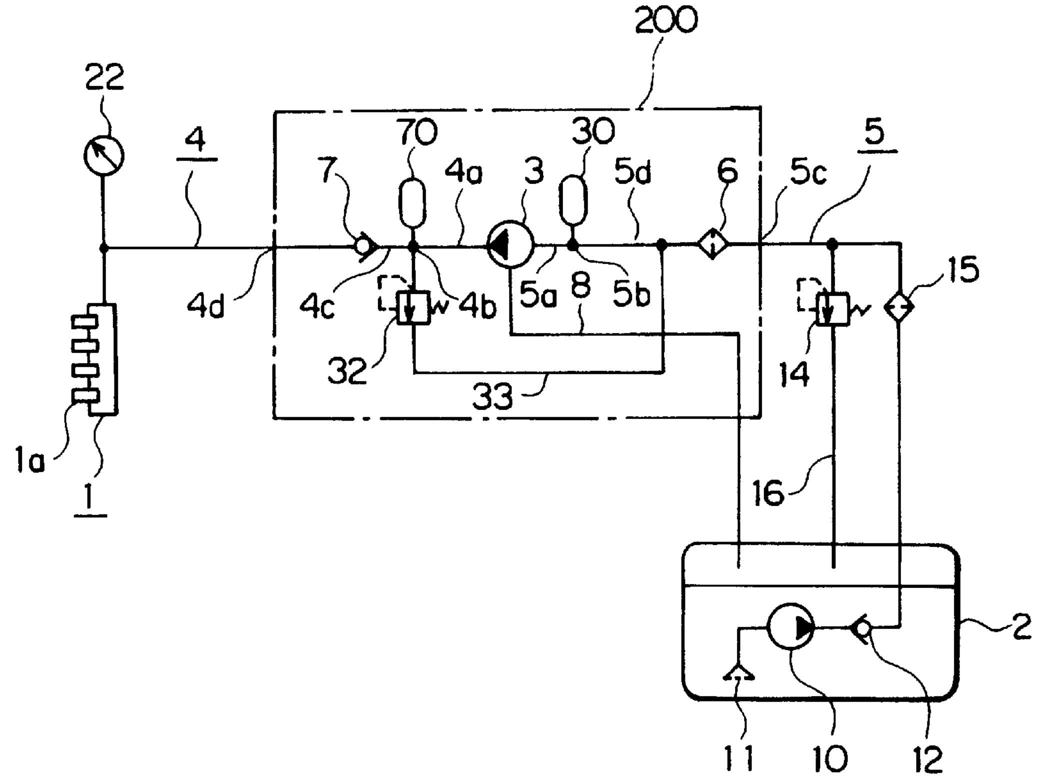
FIG. 11 is a system diagram of a high-pressure fuel supply system provided with a high-pressure accumulator to which the present invention can be applied.
Figure 13:
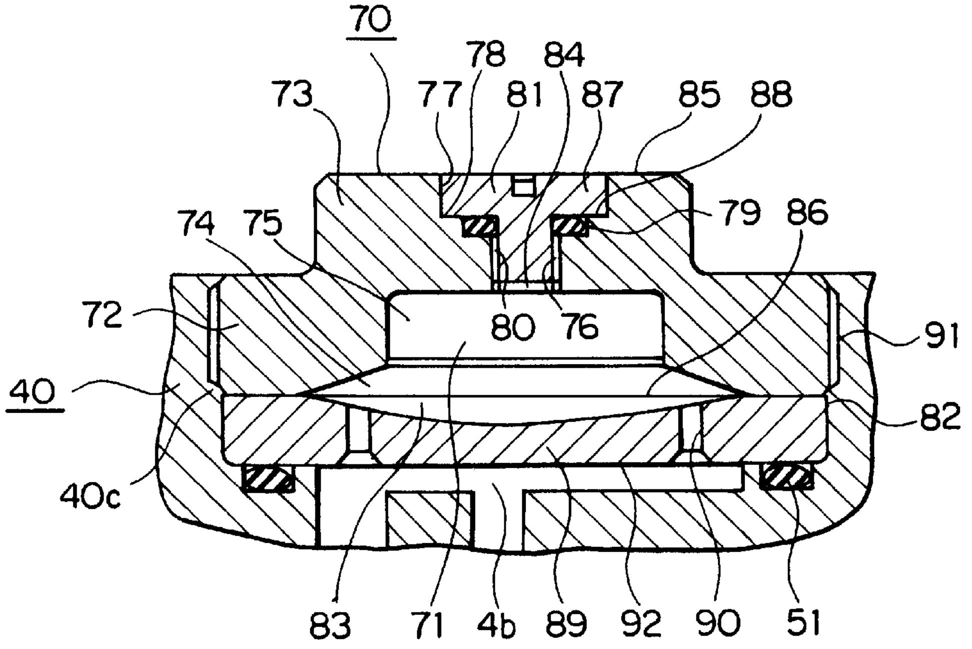
FIG. 13 is a cross-section of the high-pressure accumulator in FIG. 12 and its fitted construction.
Figure 12:
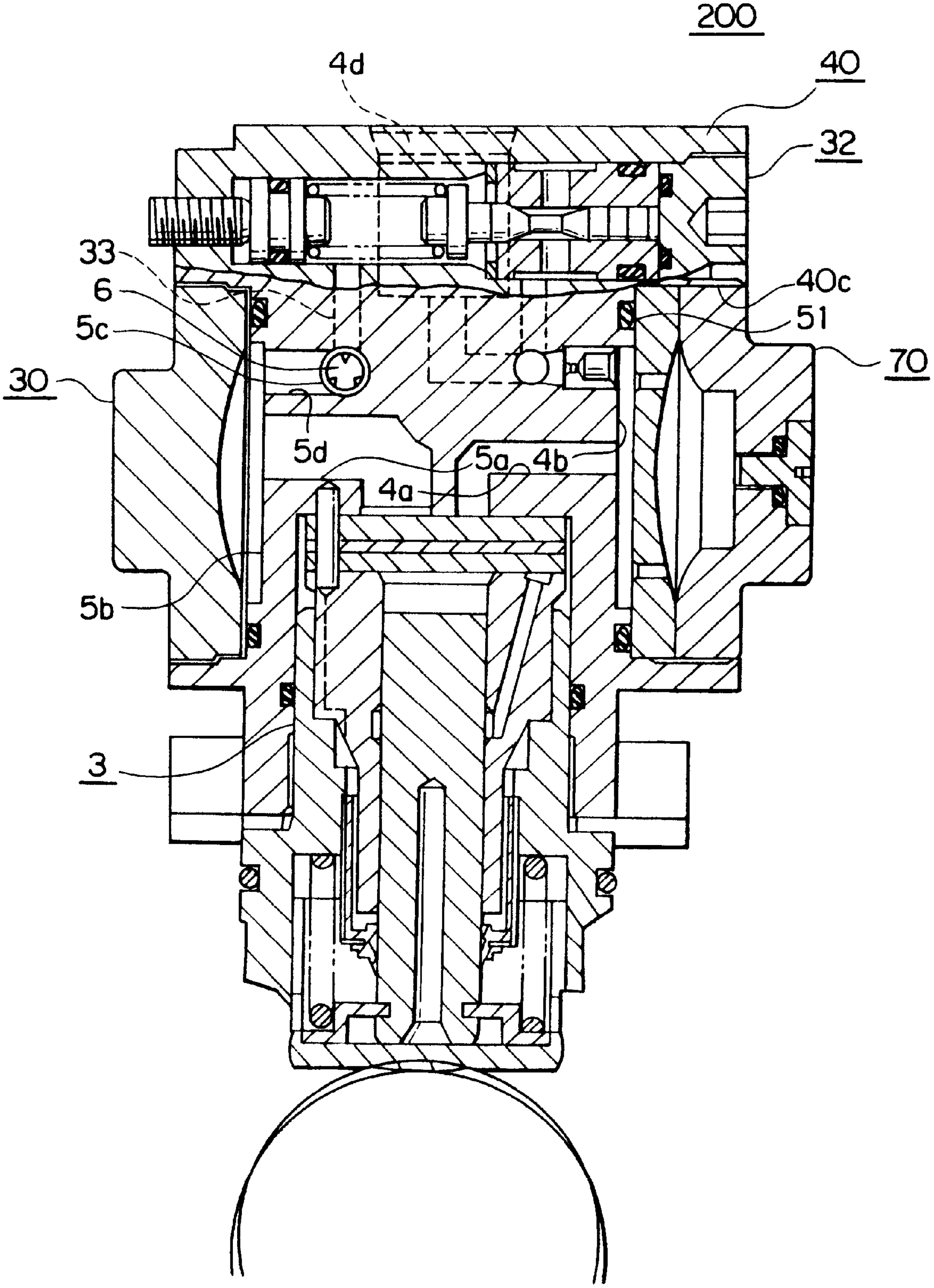
FIG. 12 is a cross-section of the high-pressure fuel pump assembly in FIG. 11.

FIG. 9 shows a high-pressure accumulator 180 which is another embodiment of the present invention and its fitted construction. FIG. 10 is a cross-section along line 10—10 in FIG. 9. Further explanation of the portions of this embodiment common to FIG. 8 will be omitted.

In FIG. 9, a support portion 187, which has an end portion 187*a*, is integrated with a case 181 as part of the case 181 in the vicinity of the center of the high-pressure chamber 185. A plurality of cylindrical holes 187*b* are disposed in a circle on the case 181.

Also, the shape of the end portion 187*a* is formed into a smooth curve so that when the diaphragm 106 deforms and comes into contact with the support portion 187, the diaphragm 106 makes contact uniformly.

In the high-pressure accumulator 180 constructed in this way, the diaphragm 106 is supported by the support portion 187 over a wide contact surface even if the diaphragm 106 is greatly displaced by a decrease in the volume of the high-pressure chamber 185, and so the diaphragm 106 is even less likely to be overstressed, and is therefore not damaged.

Also, the cylindrical holes 187*b* can easily be cut by a machine.

As explained above, a saucer-shaped recess portion is disposed in each of the high-pressure vessels, namely cases 101, 121, 141, 161, 181, to allow displacement of the diaphragm 106 and even deeper recess portions have been cut therein to provide the respective high-pressure chambers 105, 125, 145, 165, 185 with necessary volume, and these deep recess portions are distributed as annular grooves 105*c*, 105*d*, 125*b*, 145*b*, 165*a* or pluralities of holes 167*a*, 187*b* to prevent abnormal displacement of the diaphragm.

The present invention provides a high-pressure vessel, a flexible disk-shaped metal diaphragm which is sealed and supported around its perimeter portion by the high-pressure vessel to form a high-pressure chamber, and support portions disposed in the high-pressure vessel having contact portions facing the vicinity of the central portion of the diaphragm to limit abnormal displacement of the central portion of the diaphragm, and so abnormal displacement of the diaphragm is prevented and thus the diaphragm is not damaged.

In the present invention, the contact portions of the support portions may also be annular and have the same center as that of the high-pressure chamber, and so the diaphragm is not displaced abnormally and thus the diaphragm is not damaged.

In the present invention, the contact portions of the support portions may also have a plurality of holes, and so the diaphragm is not damaged.

In the present invention, the contact portions of the support portions may also have curved surfaces which extend continuously from the high-pressure vessel and have a plurality of holes, so that the diaphragm makes contact with the support portions uniformly, and so the diaphragm is not displaced abnormally and thus the diaphragm is not damaged.

In the present invention, the support portions may also be integrated with the high-pressure vessel, and so support portion parts do not have to be installed and the number of parts is reduced.

In the present invention, the support portions may also be separate members from the high-pressure vessel which are disposed in a recess in the high-pressure vessel, and so milling of the recess portion of the high-pressure vessel is made easier.

The present invention may also provide a plate having a seal portion on its cylindrical outer wall which is disposed in a position on the opposite side of the diaphragm from the high-pressure vessel, and so the sealing of the high-pressure accumulator in its fitted construction is improved.

What is claimed is:

1. A high-pressure accumulator provided with:

a high-pressure vessel;

a discrete flat flexible disk-shaped metal diaphragm which is sealed and supported around a perimeter portion thereof by said high-pressure vessel to form a high-pressure chamber; and support portions separate and distinct from said diaphragm, said support portions being disposed in said high-pressure vessel and having contact portions facing the vicinity of a central portion of said diaphragm to limit abnormal displacement of the central portion of said diaphragm.

2. The high-pressure accumulator according to claim 1 provided with a plate having a seal portion on its cylindrical outer wall which is disposed in a position on the opposite side of said diaphragm from said high-pressure vessel.

3. The high-pressure accumulator according to claim 1 wherein said support portions are integrated with said high-pressure vessel.

4. The high-pressure accumulator according to claim 3 provided with a plate having a seal portion on its cylindrical outer wall which is disposed in a position on the opposite side of said diaphragm from said high-pressure vessel.

5. The high-pressure accumulator according to claim 1 wherein said support portions are separate members from said high-pressure vessel which are disposed in a recess in said high-pressure vessel.

6. The high-pressure accumulator according to claim 5 provided with a plate having a seal portion on its cylindrical outer wall which is disposed in a position on the opposite side of said diaphragm from said high-pressure vessel.

7. The high-pressure accumulator according to claim 1 wherein said contact portions of said support portions are annular and have the same center as that of said high-pressure chamber.

8. The high-pressure accumulator according to claim 7 provided with a plate having a seal portion on its cylindrical outer wall which is disposed in a position on the opposite side of said diaphragm from said high-pressure vessel.

9. The high-pressure accumulator according to claim 7 wherein said support portions are integrated with said high-pressure vessel.

10. The high-pressure accumulator according to claim 9 provided with a plate having a seal portion on its cylindrical outer wall which is disposed in a position on the opposite side of said diaphragm from said high-pressure vessel.

11. The high-pressure accumulator according to claim 7 wherein said support portions are separate members from said high-pressure vessel which are disposed in a recess in said high-pressure vessel.

12. The high-pressure accumulator according to claim 11 provided with a plate having a seal portion on its cylindrical outer wall which is disposed in a position on the opposite side of said diaphragm from said high-pressure vessel.

13. The high-pressure accumulator according to claim 1 wherein said contact portions of said support portions have a plurality of holes.

14. The high-pressure accumulator according to claim 13 wherein said support portions are integrated with said high-pressure vessel.

15. The high-pressure accumulator according to claim 13 wherein said support portions are separate members from said high-pressure vessel which are disposed in a recess in said high-pressure vessel.

16. The high-pressure accumulator according to claim 15 provided with a plate having a seal portion on its cylindrical outer wall which is disposed in a position on the opposite side of said diaphragm from said high-pressure vessel.

17. The high-pressure accumulator according to claim 1 wherein said contact portions of said support portions have curved surfaces which extend continuously from said high-pressure vessel and have a plurality of holes.

18. The high-pressure accumulator according to claim 17 wherein said support portions are integrated with said high-pressure vessel.

19. The high-pressure accumulator according to claim 18 provided with a plate having a seal portion on its cylindrical outer wall which is disposed in a position on the opposite side of said diaphragm from said high-pressure vessel.

20. A high-pressure accumulator provided with:

a high-pressure vessel;

a flexible disk-shaped metal diaphragm which is sealed and supported around its perimeter portion by said high-pressure vessel to form a high-pressure chamber;

a support portion disposed in said high-pressure vessel having a contact portion facing the vicinity of the central portion of said diaphragm to limit abnormal displacement of the central portion of said diaphragm; and a plate having a seal portion on its cylindrical outer wall which is disposed in a position on the opposite side of said diaphragm from said high-pressure vessel.

* * * * *